United States Patent [19]
Strubhar et al.

[11] 3,858,658
[45] Jan. 7, 1975

[54] HYDRAULIC FRACTURING METHOD FOR LOW PERMEABILITY FORMATIONS

[75] Inventors: Malcolm K. Strubhar, Irving; John L. Fitch; Edwin E. Glenn, Jr., both of Dallas, all of Tex.

[73] Assignee: Mobil Oil Corporation, New York, N.Y.

[22] Filed: Nov. 19, 1973

[21] Appl. No.: 417,438

[52] U.S. Cl.................. 166/308, 166/280, 166/271
[51] Int. Cl............................................ E21b 43/26
[58] Field of Search ........... 166/308, 280, 283, 281, 166/271, 259

[56] References Cited
UNITED STATES PATENTS

| | | | |
|---|---|---|---|
| 3,224,506 | 12/1965 | Huitt et al. | 166/308 X |
| 3,372,752 | 3/1968 | Prater | 166/280 |
| 3,592,266 | 7/1971 | Tinsley | 166/308 |
| 3,664,422 | 5/1972 | Bullen | 166/308 X |
| 3,709,300 | 1/1973 | Pye | 166/280 |
| 3,710,865 | 1/1973 | Kiel | 166/308 |
| 3,760,881 | 9/1973 | Kiel | 166/308 |

*Primary Examiner*—Stephen J. Novosad
*Attorney, Agent, or Firm*—A. L. Gaboriault; Henry L. Ehrlich

[57] ABSTRACT

This specification discloses a hydraulic fracturing method for forming long, narrow, vertical fractures in a thick, low permeability formation. The formation is treated by injecting thereinto in a single stage and at a relatively low injection rate a very large volume of relatively low viscosity fracturing fluid.

6 Claims, No Drawings

HYDRAULIC FRACTURING METHOD FOR LOW PERMEABILITY FORMATIONS

BACKGROUND OF THE INVENTION

This invention is directed to the method of hydraulically fracturing a subterranean formation. More specifically, this invention is directed to a method of forming long vertically disposed fractures in a thick subterranean formation.

Hydraulic fracturing techniques have been extensively used for increasing the recovery of hydrocarbons from subterranean formations. These techniques involve injecting a fracturing fluid down a well and into contact with the subterranean formation to be fractured. Sufficiently high pressure is applied to the fracturing fluid to initiate and propagate a fracture into the subterranean formation. It is generally considered that at depth the fractures that are formed are vertical fractures. This is because at depth most formations have a preferred vertical fracture orientation which exists because of naturally occurring planes of weakness in the formation and the fractures form and are propagated along these planes of weakness. Proppant materials are generally entrained in the fracturing fluid and are deposited in the fracture to maintain the fracture open.

Many different types of fracturing fluids have been employed. The evaluation of hydraulic properties of fracturing fluids is reviewed in an article "What to Learn About Hydraulic Fracturing Fluids," T. C. Buchley and D. L. Lord, THE OIL AND GAS JOURNAL, Sept. 17, 1973, pp. 84–88. Buchley et al. state that present-day fracturing fluids are classed as Newtonian, polymer solutions, cross-linked polymer solutions, emulsions, micellar solutions, and gelled-organic liquids in solution with a liquefied gas. They teach that a fracturing fluid should be compatible with both rock matrix material and natural fluids contained within the matrix pores. The created fracture volume is greatly diminished if a large portion of injected fluid is lost to porous fracture faces. If the fluid does not inherently have satisfactory fluid loss control, it is generally necessary to add particulate and/or gelatinous material which forms a filter cake on fracture faces to control loss to the porous matrix. A fluid that has a low friction loss is desirable for displacement down a well because it affords a more efficient use of surface pumping equipment. However, a viscous fluid is desirable because it supports the proppant, helps prevent damage to surface mixing and pumping equipment and is desirable in the fracture because it creates wider fractures and better transports the proppant.

In Newtonian fluid terms, low friction loss criteria are usually met by a fluid with low density and viscosity. However, Newtonian fluids are infrequently used as fracturing fluids because they produce large wellbore pressure drops. Most fracturing fluids are non-Newtonian fluids. Newtonian fluids are significant, however, because they are the main ingredients in the formulation of fracturing fluids. It is the addition of polymers and/or other components to water, oil, or alcohol which produces most present-day fracturing fluids.

In U.S. Pat. No. 3,710,865 there is described a fracturing method which employs an improved oil-in-water emulsion. It is there pointed out that it has long been known that the fluid efficiency of a fracturing fluid must be high if fractures of reasonable lengths and widths are to be obtained. Fluid efficiency as used in fracturing operations is defined as the percent of injected fluid which remains within the fracture and is a measure of the fluid loss characteristics of the fluid. Many fluids tend to leak off rapidly into the formation matrix and therefore provide low fluid efficiencies. The fluid efficiency can be improved by the addition of fluid loss control additives. The characteristics of an ideal fracturing fluid are summarized as follows: low friction loss in the well conduit, low fluid loss in the fracture, high friction loss in the fracture, good proppant suspension capability, and easily produced from the formation and fracture. The recent trend in fracturing fluid formulation has been toward high viscosity fluids. Experience has shown that these fluids when properly injected can be used to generate wide fractures of considerable length and that they are capable of suspending large propping agent particles in high concentrations.

In an article, "Reservoir Fracturing—A Method of Oil Recovery from Extremely Low Permeability Formations," L. E. Wilsey and W. G. Bearden, TRANSACTIONS OF THE AMERICAN INSTITUTE OF MINING AND METALLURGICAL ENGINEERS, Vol. 201 (1954), pp. 169–175, there is presented results of an analysis of the effect of fracturing on initial flow rates and on ultimate recoveries from low capacity oil formations. This analysis showed that even in formations of permeability as low as 0.1 millidarcy large fracture treatments can yield oil recoveries and production rates approaching those of high permeability formations. It was assumed that a horizontal fracture of relatively high-fluid carrying capacity extended from a wellbore. The analysis then turned to a study to determine the treating techniques and materials required to create fractures of this size. This study indicated that the higher the fracturing fluid viscosity and the larger the volume of fluid injected, the larger will be the fracture created; permeability inversely affects the fracture radius, that is, the lower the permeability, the larger the fracture.

In a paper entitled "Low Permeability Gas Reservoir Production Using Large Hydraulic Fractures," by Stephen Allen Holditch and R. A. Morse, which was prepared for the 45th Annual Fall Meeting of the SOCIETY OF PETROLEUM ENGINEERS of AIME, Oct. 4–7, 1970, there is presented a study of stimulating low permeability reservoirs by the creation of long hydraulic fractures, which study was made using a two-dimensional, two-phase numerical model. Horizontal fractures having radii of 1,000 and 3,000 feet and located in the center of the formation were modeled. Vertical fractures were also modeled for lengths of 1,000 and 3,000 feet. This study indicated that the low capacity of wells located in extremely low permeability formations can be greatly improved by hydraulic fracturing. No attempt was made to justify the feasibility of obtaining the various fractures, or to imply that these fractures can be introduced in any specific formation at will.

In a paper entitled "A Staged Fracturing Treatment for Multisand Intervals" by B. B. Williams, G. Nieto, H. L. Graham, and R. E. Leibach, which was prepared for the 47th Annual Fall Meeting of the SOCIETY OF PETROLEUM ENGINEERS of AIME, Oct. 8–11, 1972, there is described a fracturing technique for stimulating massive formations containing many individual sand lenses. This treatment consists of a number of individual stages, the average being about 13. Each stage consists of a fluid pad followed by fluid containing proppant. Ball sealers are used to separate stages.

An article entitled "Graphic Solution To Fracture Treatment Design," by C. R. Fast, PETROLEUM ENGINEER, October, 1973, pp. 39–46, is concerned with fracturing massive, very low permeability gas sands. This paper indicates that hydraulic fracturing has particular application for treating such sands and that it will be necessary to conduct engineered fracturing jobs so that a major portion of the net pay is contacted by vertical fractures that extend 1,000 feet or more in two directions out from the well. This will require selectively fracturing the multiple pay zones in the wells with one-half million or more gallons of fluid divided in several stages. It is pointed out that high quality fracturing fluids and high pump rates will be required to achieve sufficient fracture penetration to result in adequate gas production to be economically feasible.

SUMMARY OF THE INVENTION

This invention is directed to forming a vertical fracture in a thick subterranean formation that has a preferred fracture orientation and is penetrated by a well. There is injected into the well in a single stage a fracturing fluid in an amount of at least 330,000 gallons and at a pressure sufficient to form and propagate a vertical fracture into the formation. The fracturing fluid has a viscosity less than 100 centipoises, contains a proppant in an amount no greater than about 4 pounds per gallon, and is injected into the formation at a rate no greater than about 0.5 barrel per minute per foot of formation. In accordance with an embodiment, the fracturing fluid has a high leak-off property.

DESCRIPTION OF THE PREFERRED EMBODIMENTS

In accordance with this invention, there is provided a method of forming long, narrow, vertical fractures in a thick, low permeability subterranean formation. This invention is particularly applicable to treating formations that have permeabilities of less than about 0.1 md (millidarcy) to improve the recovery of hydrocarbons therefrom. For such treatments to be commercially rewarding, the formation should be thick, that is, have a thickness of at least about 100 feet. The fracture which is formed therein should also extend vertically essentially for the entire thickness of the formation or at least extend vertically for a distance of about 100 feet and extend laterally for a distance of at least one half and preferably for the entire distance of the drainage radius of a well communicating with the formation in which the fracture is formed. The normal range of well spacings for wells communicating with such low permeability formations is 80 acres to 640 acres. The drainage radius is the distance from the center of a well to the boundary of the region being drained by the well. In the case of a pattern of regularly spaced wells the drainage radius is one half of the well-to-well distance for regularly spaced wells. The drainage radii for 80- and 640-acre spacing are 933 and 2,640 feet, respectively. The fracture should also be propped to provide sufficient fluid conductivity to transport without undue pressure loss the hydrocarbons which flow from the formation into the fracture.

To form a long fracture in a thick formation requires that a very large volume of fracturing fluid and proppant material be injected into the formation. This invention is directed to tailoring the fracturing fluid and proppant material to form the long vertical fracture. More specifically, this invention is directed to controlling the properties and injection rate of the fracturing fluid to form a narrow fracture, that is, a fracture that has a width of no greater than one-half an inch.

In accordance with this invention, a long, narrow fracture is formed in a thick, low permeability formation by injecting through a well communicating with the formation in a single stage a fracturing fluid which has an apparent viscosity of no greater than 100 centipoises and preferably no greater than 50 centipoises, and carries entrained therein proppant material in an amount no greater than 4 pounds per gallon and normally no greater than 3 pounds per gallon. This fracturing fluid is injected into the formation in a single stage in an amount of at least 330,000 gallons and at a pressure sufficient to form and propagate the vertical fracture into the formation. The fracturing fluid is injected into the formation at a rate no greater than about 0.5 barrel per minute per foot of formation. By employing -acre viscosity fracturing fluid and injecting -acre fluid at a rate no greater than 0.5 barrel per minute per foot of formation, a narrow fracture, that is, a fracture having a width no greater than 0.5 inch, is formed and propagated into the formation. The volume of 330,000 gallons is sufficient to propagate into the formation a vertical fracture having a height of at least 100 feet for a distance of at least 0.8 of the drainage radius of the well on a 160-acre spacing. To prop such a fracture with sand requires at least about 450,000 pounds of sand.

It is considered that such low permeability formations will preferably be developed using a pattern spacing of at least 160 acres. Therefore, the 330,000 gallons of fracturing fluid and 450,000 pounds of sand are based upon a 160-acre spacing. The spacing may, of course, be larger and may, for example, be a 640-acre spacing. For a 640-acre spacing, the maximum volume of fracturing fluid and weight of sand which would be required to extend a vertical fracture having a width of about 0.5 inch, a height of 100 feet, and for a distance about equal to the drainage radius is about 1,500,000 gallons and about 2,500,000 pounds.

In forming such massively long fractures it is extremely important that the width of the fracture be controlled in order to limit the volumes of fracturing fluid and proppant material required to form the fracture. It is desirable to control the width of the fracture to a width no greater than 0.5 inch. In order to efficiently create such massively long fractures, it is necessary that the fracture be formed in a single stage. Thus, once the fracture has been initiated, it is necessary that the propagation thereof be continued until the desired fracture length has been attained. It is also necessary that the fracturing fluid that is used have an apparent viscosity of no greater than 100 centipoises and be injected into the formation at a rate no greater than 0.5 barrel per minute per foot of formation being fractured in order to limit the width of the fracture formed to a width of no greater than 0.5 inch. It is highly desirable that the fracturing fluid have a high leak-off property. That is, the fluid efficiency of the fracturing fluid should be substantially less than 100 percent. Fluid efficiency is related to the fluid coefficient as discussed in HYDRAULIC FRACTURING, by G. C. Howard and C. R. Fast. For example, on page 34 it is there stated in referring to the fracturing fluid coefficient that this coefficient depends on the characteristics of the fracturing fluid used and on the characteristics of the reservoir fluids and rock. A high coefficient means poor fluid-loss properties, and a low coefficient means low fluid-loss properties. It is also desirable that the fracturing fluid be free of fluid-loss additives. The high leak-off property combined with the low viscosity and low injection rate enables a fracture to be propagated for great distances into a low permeability formation while controlling the width of the fracture to the width of no greater than 0.5 inch.

A preferred fracturing fluid is water, though other low viscosity fluids, such as crude oil, may be used. Low concentrations of gelling agents, such as guar gum, may be added to the fracturing fluid to give it the desired characteristics for a particular case. These concentrations would be limited to an amount required to give an apparent fluid viscosity of less than 100 centipoises. The preferred proppant is sand, having a size of 20 to 40 mesh. Sand having other size ranges, e.g., between 10–20 and 40–60 mesh, may be used, however. The sand concentration in the fracutring fluid is preferably no greater than about 4 pounds per gallon and normally is no more than about 3 pounds per gallon.

A thick subterranean formation may have one or more impermeable strata which extend through the formation and partition the formation into at least a first reservoir and a second reservoir. This invention is applicable for treating such formations to form a long, narrow fracture in each reservoir. Such formations, to be commercially attractive, should have a thickness of at least 200 feet and the first and second reservoir should each have a thickness of at least 100 feet. In accordance with this invention, there is injected through a well communicating with the first reservoir in a single stage, a high leak-off fracturing fluid having an apparent viscosity less than about 100 centipoises and containing a proppant in an amount no greater than about 4 pounds per gallon. At least 330,000 gallons of the fracturing fluid are injected into the first reservoir at a pressure sufficient to form and propagate a vertical fracture into the formation. The fracturing fluid is injected into the first reservoir at a rate no greater than about 0.5 barrel per minute per foot of formation to be fractured. After forming the first vertical fracture in the first reservoir, these steps are repeated to form a second vertical fracture in the second reservoir.

This invention is particularly applicable for treating a gas-bearing formation that has an in-place gas permeability of less than about 0.05 millidarcy. It is preferable to use an aqueous fracturing fluid when treating the gas-bearing formation to avoid damaging the formation and reducing the in-place permeability.

We claim:

1. A method of forming a vertical fracture in a thick subterranean formation having a preferred vertical fracture orientation from a well penetrating said formation, comprising the steps of:

injecting fracturing fluid in a single stage via said well into said formation at a pressure sufficient to form and propagate a vertical fracture into said formation, said fracturing fluid being injected at a rate no greater than about 0.5 barrel per minute per foot of formation, and being comprised of a liquid having an apparent viscosity of less than about 100 centipoises and containing a proppant in an amount no greater than about four pounds per gallon; and continuing to inject said fracturing fluid via said well into said formation until at least 330,000 gallons of said fracturing fluid are injected thereinto.

2. The method of claim 1 wherein said fracturing fluid has high leak-off properties.

3. The method of claim 2 wherein said fracturing fluid is an aqueous fracturing fluid having an apparent viscosity less than about 50 centipoises.

4. The method of cliam 3 werein said proppant is sand.

5. A method of forming a vertical fracture in a subterranean formation having a thickness of at least 100 feet and having a preferred vertical fracture orientation, said formation being penetrated by a well having a drainage radius of at least 1,320 feet, comprising the steps of:

injecting a high leak-off aqueous fracturing fluid in a single state via said well into said formation at a pressure sufficient to form and propagate a vertical fracture into said formation, said fracturing fluid being injected at a rate no greater than about 0.5 barrel per minute per foot of formation, and being comprised of a liquid having an apparent viscosity of less than about 100 centipoises and containing a proppant in an amount no greater than about three pounds per gallon; and continuing to inject said fracturing fluid via said well into said formation until at least 330,000 gallons of said fracturing fluid are injected thereinto.

6. A method of forming a plurality of vertical fractures in a subterranean formation having a thickness of at least 200 feet and having at least one stratum that partitions said subterranean formation into at least a first reservoir and a second reservoir, each reservoir having a thickness of at least 100 feet, said formation being penetrated by a well, comprising the steps of:

a. injecting a high leak-off fracturing fluid in a single stage via said well into said first reservoir at a pressure sufficient to form and propagate a vertical fracture into said first reservoir, said fracturing fluid being injected at a rate no greater than about 0.5 barrel per minute per foot of said first reservoir, and being comprised of a liquid having an apparent viscosity of less than about 100 centipoises and containing a proppant in an amount no greater than about 4 pounds per gallon;

b. continuing to inject said fracturing fluid via said well into said first reservoir until at least 330,000 gallons of said fracturing fluids are injected thereinto; and c. repeating steps (a) and (b) in said second reservoir.

* * * * *

UNITED STATES PATENT OFFICE
CERTIFICATE OF CORRECTION

Patent No. 3,858,658           Dated January 7, 1975

Inventor(s) Malcolm K. Strubhar et al.

It is certified that error appears in the above-identified patent and that said Letters Patent are hereby corrected as shown below:

Column 4, lines 24 and 25, sentence should read --By employing a low viscosity fracturing fluid and injecting the fracturing fluid ... --.

Column 6, Claim 4, line 18, "cliam" should read --claim--; and

Claim 5, line 27, "state" should read --stage--.

Signed and sealed this 4th day of March 1975.

(SEAL)
Attest:

RUTH C. MASON  
Attesting Officer

C. MARSHALL DANN  
Commissioner of Patents  
and Trademarks